United States Patent
Watanabe et al.

(10) Patent No.: US 6,954,690 B2
(45) Date of Patent: Oct. 11, 2005

(54) VEHICLE MOVEMENT STABILIZING DEVICE

(75) Inventors: Takashi Watanabe, Asahi-machi (JP); Shoichi Masaki, Asahi-machi (JP); Moriharu Sakai, Asahi--machi (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/702,735

(22) Filed: Nov. 7, 2003

(65) Prior Publication Data

US 2004/0094634 A1 May 20, 2004

(30) Foreign Application Priority Data

Nov. 12, 2002 (JP) ....................................... 2002-328784

(51) Int. Cl.$^7$ ............................................ G01M 17/00
(52) U.S. Cl. ............................... 701/35; 291/2; 291/3; 246/182 B; 180/271; 303/150
(58) Field of Search ................................ 291/2; 701/70, 701/71, 73; 288/757; 301/70; 477/182, 184

(56) References Cited

U.S. PATENT DOCUMENTS

| | | | | |
|---|---|---|---|---|
| 1,121,988 A | * | 12/1914 | Doyle et al. ..................... | 291/2 |
| 2,208,739 A | * | 7/1940 | Hines ............................ | 291/2 |
| 5,634,699 A | * | 6/1997 | Ichikawa et al. ............ | 303/150 |
| 6,026,343 A | * | 2/2000 | Ogino ........................... | 701/72 |
| 6,494,281 B1 | * | 12/2002 | Faye et al. ................... | 180/197 |
| 6,556,908 B1 | * | 4/2003 | Lu et al. ....................... | 701/38 |
| 6,629,709 B1 | * | 10/2003 | Tunley et al. .................. | 291/2 |
| 2002/0103587 A1 | * | 8/2002 | Kim ............................. | 701/37 |

FOREIGN PATENT DOCUMENTS

| | | |
|---|---|---|
| JP | 8-25905 A | 1/1996 |
| JP | 8-156760 A | 6/1996 |

* cited by examiner

*Primary Examiner*—Frantz F. Jules
(74) *Attorney, Agent, or Firm*—Burns, Doane, Swecker & Mathis LLP

(57) ABSTRACT

A vehicle movement stabilizing device is provided which in effectively functioning braking, acceleration and turning movement during travel of the vehicle by activating the frictional force adding device, reliably controls the start and end of the operation of the frictional force adding device and prevents repetition of unnecessary operations. The vehicle movement stabilizing device is provided with frictional force adding device for increasing the frictional force of the wheels to the road surface by scattering particles and a controller. The controller is structured to start the operation of the frictional force adding device when it detects the operation start conditions based on signals from wheel speed sensors, a hydraulic pressure sensor and a step-in force sensor during braking, and to stop its operation if signals indicating disappearance of the state are detected, thereby preventing repetition of unnecessary operations.

4 Claims, 8 Drawing Sheets

VEHICLE MOVEMENT STABILIZING DEVICE

BACKGROUND OF THE INVENTION

This invention relates to a vehicle movement stabilizing device for stabilizing the movement of a traveling vehicle during braking, accelerating or turning by controlling frictional force adding means for increasing the frictional force of the wheels or vehicle to the road surface, and reliably carrying out the stabilizing control.

A traveling vehicle is operated by carrying various movements such as braking, acceleration and turning according to the condition of the road surface by operating the brakes, accelerator and steering wheel. For any movement, it is a prerequisite that the friction coefficient $\mu$ of the wheels to the road surface is a normal value (high-$\mu$ road) such as on an asphalt road, and stable travel is ensured by the braking action by a brake device (first braking device) for applying brakes to the rotation of the wheels. Among actual road surfaces, there are low-$\mu$ roads where the value of $\mu$ is extremely small, such as frozen roads, on which it is impossible to achieve stable travel because of insufficient braking operation by the first braking device.

Thus, besides the first braking device, means is desired which can add the frictional force by some means. As such means, one is means which increase the friction coefficient $\mu$ of the wheels to the road surface, and another is means which impart frictional force of the vehicle to the road surface. As the former means, spike tires have been proposed and embodied. But because spike tires abrade roads and cause dust pollution, they are prohibited now. Also, a so-called ABS (antilock brake system) is widely known as a system which efficiently carries out braking of wheels by recovering the frictional coefficient as much as possible by interrupting braking at short intervals. But sufficient braking force was sometimes not obtained because the value $\mu$ is extremely small on frozen roads.

As a measure to directly increase the friction coefficient $\mu$, a slip preventive assisting device is proposed by JP patent publication 8-25905 (publication 1). In this publication 1, a slip preventive assisting device is disclosed in which because dust pollution and environmental pollution occur if sand is scattered to prevent slip, slip preventive particles such as ice particles are scattered together with water to increase the friction coefficient $\mu$ so that slip can be prevented without pollution.

As a means which can add frictional force to the wheel even if the friction coefficient $\mu$ is small, an emergency brake device is proposed in JP patent publication 8-156760 (publication 2). In the device of publication 2, a second braking means comprising a friction material which can directly engage the road surface and a hydraulic cylinder for operating the friction material is provided. If detection is made that the friction coefficient $\mu$ of the road surface is so small as to fall into a slip state by normal braking, the second braking means is activated to put the friction material into engagement with the road surface to impart frictional force to the vehicle.

With the slip preventive device of publication 1, it is possible to increase the friction coefficient $\mu$ between the tires and the road surface by scattering slip preventive particles. With the emergency braking device, too, it is possible to obtain frictional force of the vehicle to the road surface by pressing and engaging the friction plate against the road surface. Thus, the device of either publication can achieve shortening of the braking distance. But in either of the devices of publications 1 and 2, while description is made about shortening the braking distance by applying effective braking to the vehicle, no mention is made whatsoever about how braking, acceleration and turning movements are controlled using the respective devices during braking, acceleration and turning of the vehicle, or how the operation is reliably finished by checking the end.

With a vehicle having the emergency brake device of publication 2, when stopping the vehicle, the driver manually presses the reset button to finish the operation. Thus, it is inferior in convenience.

An object of this invention is to provide a vehicle movement stabilizing device in which in effectively functioning braking, acceleration and turning movement during travel of the vehicle by activating frictional force adding means to achieve stability of travel, start and end of the activation of the frictional force adding means are controlled so as to be carried out automatically, reliably and suitably, while preventing repetition of unnecessary operations.

SUMMARY OF THE INVENTION

According to the present invention, there is provided a vehicle movement stabilizing device comprising frictional force adding means having an actuator and an actuated member for increasing the frictional force of wheels to a road surface by driving the actuated member with the actuator, various sensors including wheel speed sensors, for detecting braking, acceleration and turning movement of the vehicle, and a controller for outputting a signal for controlling the activation of the actuator in response to signals from the sensors, the controller being structured to output control signals for starting control in response to the signals from the sensors, and to output a signal for ending the activation of the actuator, which is driven if the frictional force of the wheels to the road surface is not more than a predetermined value during braking, acceleration or turning of the vehicle, if the controller detects an end signal indicating that the state necessitating the driving of the actuator has disappeared.

With the vehicle movement stabilizing device of this invention, control is carried out such the frictional force adding means are operated to stabilize the movements of braking, acceleration and turning during travel of the vehicle to achieve stabilization of the vehicle movement, and also repetition of unnecessary operation of the frictional force adding means is effectively prevented by reliably controlling the start and end of the operation. During braking (by the first brake device) during travel of the vehicle, the operation of the frictional force adding means is started by the stabilizing device in response to the signals from the sensors and switches. Specifically, it is carried out under the following conditions.

That is, operation is started if the step-in switch of the brake pedal is activated (on), travel of the vehicle is confirmed by wheel speed sensors, the vehicle deceleration is not more than a predetermined value, and the stepping force detected by the stepping force sensor is not less than a predetermined value, or if while the vehicle deceleration is not less than the predetermined value, the wheel slip of one or more wheels is not less than a predetermined value, or a signal indicating the ABS being activated is being received, if while the vehicle deceleration is not more than the predetermined value, the stepping force detected by the stepping force sensor is not more than the predetermined value, and the wheel slip of one or more wheels is not less than the predetermined value, or a signal indicating the ABS being activated is being received. This is because under any of these conditions, the value of μ is determined to be so small that the wheel slip would exceed the limit with the braking by the first brake device, and it is determined to be a state in which the frictional force adding means should be activated.

On the other hand, the end of operation of the frictional force adding means should be done when the state to drive the actuator has disappeared. Specifically, control is carried out under the following conditions. That is, the operation is ended if the step-in switch of the brake pedal is off, the vehicle is at a stop, the vehicle deceleration is above a predetermined value, if the degree of stepping force is not more than a predetermined value, the difference between the stepping force this time and the previous one is not more than a predetermined value, the wheel slip of all four wheels continues is below a predetermined value for a predetermined period or over, or if the state in which the ABS is not activating continues for a predetermined period or over. That any of these conditions is met means that the state requiring to keep the frictional force adding means activated has disappeared. Thus, it is possible to automatically stop the activation even if an operator does not press a reset SW every time.

While accelerating the vehicle, start of operation of the frictional force adding means by means of the stabilizing device is similar to the above. Specifically, it is carried out under the following conditions. That is, its operation is started if the vehicle acceleration is a small value below a predetermined value and the degree of opening of the throttle is larger than a predetermined value, or if while the degree of opening of the throttle is smaller than the predetermined value, the acceleration slip of one or more wheels is not less than a predetermined value, or a signal indicating the TRC (traction) control being activated is received.

The end of operation during acceleration is if the step-in switch of the brake pedal is activated, if the vehicle acceleration is not less than a predetermined value, if the degree of opening of the throttle is not more than a predetermined value, if the difference between the degree of opening of the throttle this time and the previous one is not more than a predetermined value, if the duration of the state in which the acceleration slip of all of the driving wheels is not more than a predetermined value is a predetermined period or over, or if the duration of the non-activated state of TRC has become not less than a predetermined value. If any one of these conditions is met, operation of the frictional force adding means is automatically stopped with the detection signal.

The start and end of operation of the frictional force adding means during turning of the vehicle are similar to the above. Specifically, they are carried out under the following conditions. That is, for the start of operation, the operation is started if the vehicle is traveling, and the OS tendency or the US tendency is large, or the VSC is being activated. Also, the operation is stopped if the vehicle stopped, the duration of the state in which the OS or US tendency is not excessive is a predetermined period or over, or the duration of the state of non-activation of the VSC is a predetermined period or over. In this case too, the frictional force adding means are activated only if necessary, and the operation can be stopped automatically.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
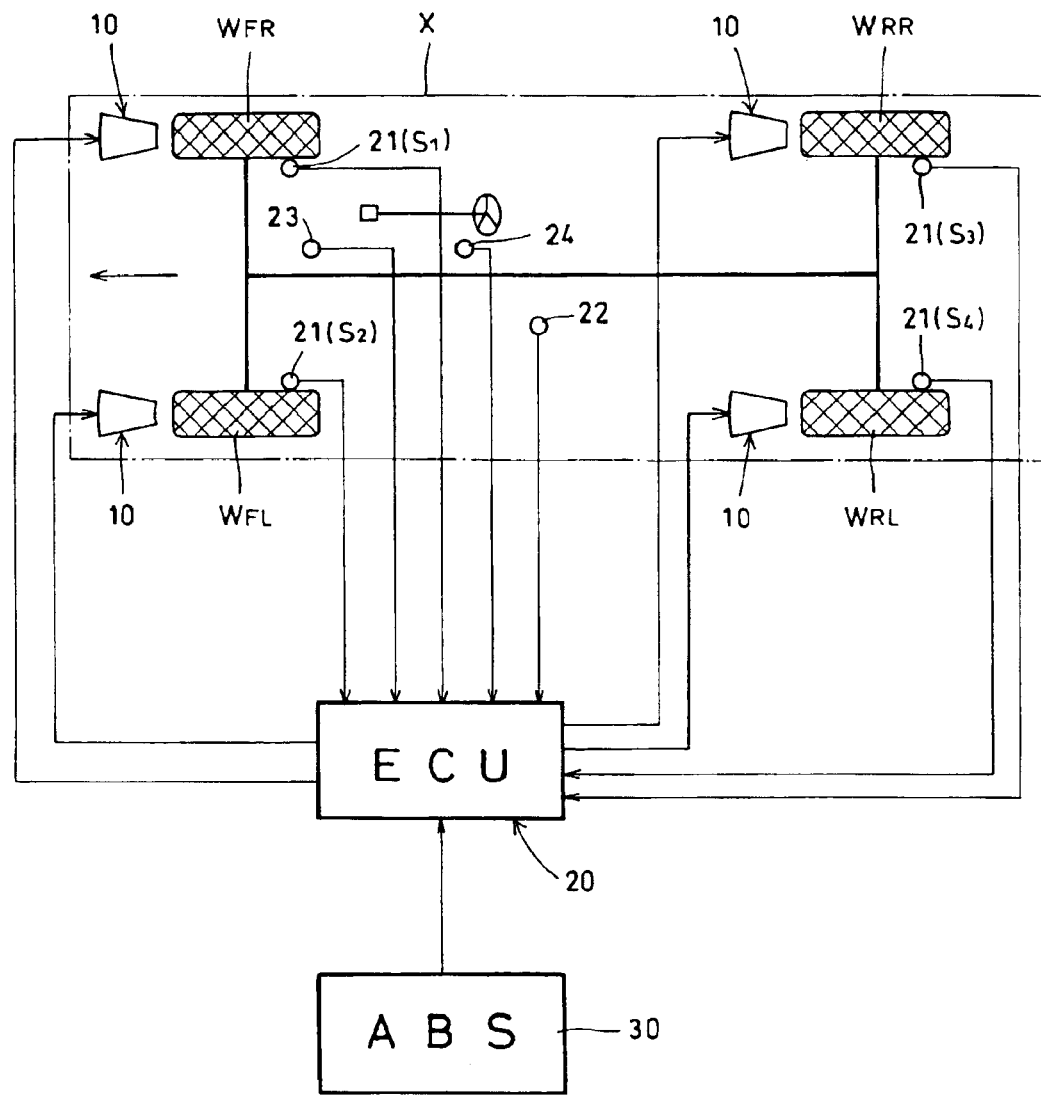
FIG. 1 is a schematic diagram of a movement stabilizing device of a first embodiment.
Figure 2:
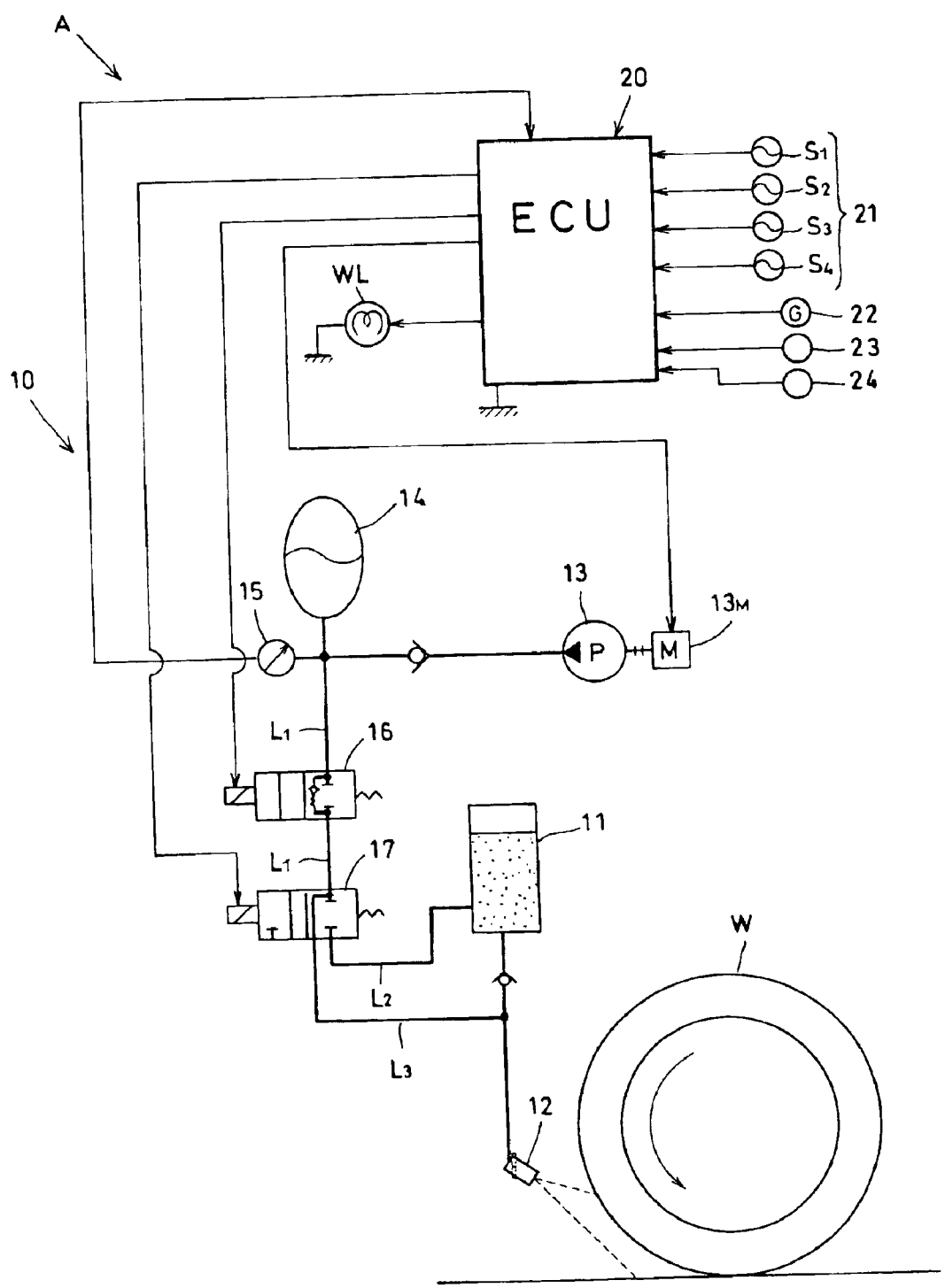
FIG. 2 is a circuit diagram of the frictional force adding means of the same.

Hereinbelow, the embodiments of this invention will be described with reference to the drawings. FIG. 1 shows a schematic diagram of the vehicle movement stabilizing device of the first embodiment, and FIG. 2 shows a circuit diagram of the movement stabilizing device including a frictional force adding means for one wheel. As shown, the vehicle X has frictional force adding means 10 in which actuated members are driven by actuators, for all of the wheels W ($W_{FR}$, $W_{FL}$, $W_{RR}$, $W_{RL}$). A controller 20 sends control signals to the actuators to drive the actuated members. The frictional force adding means 10 will be described later. To the controller 20, as shown, detection signals from wheel speed sensors 21 ($S_1$–$S_4$) for detecting the speeds of the respective wheels, front and rear G sensors 22 for detecting acceleration and deceleration in the forward and backward directions of the vehicle, a brake hydraulic pressure sensor 23 (or stepping force sensor), and a brake pedal step-in switch (STP-SW) 24 are input.

The brake hydraulic pressure sensor (or stepping force sensor) 23 is a sensor for detecting hydraulic pressure in the hydraulic circuit of an unillustrated ordinary brake device (first brake device) for applying brake to the rotation of the wheels. This hydraulic pressure sensor 23 and the brake pedal step-in switch 24 are sensors or switches for detecting that the brakes have been relaxed. Or in this embodiment, an ABS controller 30 is provided for the first brake device. Under the ABS control, when ABS control is carried out, an ABS control activating signal indicating its activation is given to the controller 20. But in the illustrated embodiment, while the ABS controller 30 is provided separately from the controller 20, it may be integrally provided in the controller 20 to output the ABS activating signal internally. The same is true for the below-described TRC controller 30' and VSC controller 30".

As shown in FIG. 2, each frictional force adding means 10 includes a particle container 11 as an activated member, and an injection nozzle 12 for discharging slip preventive particles stored in the container 11 into between the wheel W and the road surface, and has various actuators for feeding compressed air into an accumulator 14 by driving a pump 13 by a motor 13M to feed the compressed air accumulated therein to the particle container 11 and the injection nozzle 12 through solenoid valves 16, 17. Pressure is maintained by driving the pump 13 in response to a detection signal from a pressure sensor (or switch) 15 to keep the pressure in the accumulator 14 at a prescribed level. As the slip preventive particles, an inorganic substance such as sand particles or a thawing agent (e.g. CMA), or an organic substance such as vegetable seeds, edible granules, turpentine powder, and particulates having a particle diameter of several tens to several hundred micrometers may be used.

The solenoid valve 16 is a changeover valve for changing over between feed and stop of compressed air. The solenoid valve 17 is a changeover valve for changing over feed to either of the particle container 11 and the injection nozzle 12. A main line $L_1$ is connected through the pump 13 and the accumulator 14 to the solenoid valves 16, 17. Piping connected to the solenoid valve 17 are a supply line $L_2$ for feeding compressed air to the particle container 11 and a bypass passage $L_3$ connected to an intermediate position of a line that feeds slip preventive particles fed from the particle container 11 to the injection nozzle 12. The bypass passage $L_3$ is provided to directly feed compressed air to the injection nozzle 12 separately from the supply line $L_2$ to avoid clogging of the injection nozzle 12, or for adjustment of the inclination direction of the nozzle.

Since the solenoid valves 16 and 17 are the two-position changeover type, they are provided in two. But if they are a three-position type, they may be one solenoid valve. Also, the injection nozzle 12 is pivotably mounted so that its angle will be adjustable to an optimum angle relative to the wheel W and the road surface. It is supported by a pivotal support portion such that the angular position is automatically adjusted at a proper position under the pressure when only compressed air is discharged through the bypass passage L3.

The controller 20 and the ABS controller 30 each comprise a microcomputer having a fixed memory storing a control program, a temporary memory for processing input data, and a computing/processing unit for carrying out computing/processing based on various data and feeding control signals. The control program in the controller 20 includes basic control for activating the frictional force adding means 10, and start/end control for reliably and quickly starting and finishing the action of the means 10.

The basic control is a control for calculating the wheel slip rates and the friction coefficients $\mu$ based on signals from the wheel speed sensors 21 of the respective wheels W and front and rear G sensors, and activating the frictional force adding means 10 if the coefficient $\mu$ is lower than the value of a normal road surface. The start/end control is a control which starts or ends the operation of the frictional force adding means 10 according to whether the vehicle is in a state in which the frictional force adding means 10 should be activated or such a state has disappeared, based on receiving or not receiving a signal indicating that the brake pedal has been stepped or relaxed, such as signals from the brake hydraulic pressure sensor 23 or step-in switch 24, a signal indicating increase or recovery of the wheel slip, or ABS activation signals.

As for the control program of the ABS controller 30, since it is not an essential point of this invention, description is made only about the summary of known general control. That is, ABS control assists effective braking by recovering the friction coefficient as much as possible by repeating the control actions of computing the wheel speeds based on input signals from the wheel speed sensors 21 ($S_1$–$S_4$), estimating the vehicle speed from the wheel speeds while referring to the value of the deceleration detected by the front and rear G sensors 22, and opening solenoid valves to release locking of the wheels only for a short time based on the value of the estimated vehicle speed. Thus, it is possible to effectively prevent the steering from becoming impossible during braking due to wheel locking caused by low frictional coefficient e.g. on wet load.

In the movement stabilizing device of this embodiment, control of movement stabilization is carried out as follows.

One feature of the function of this movement stabilizing device lies in that start and end of operation of the frictional force adding means 10 is controlled reliably. Before describing the feature, description will be made about the control of the stabilizing movement. The control is carried out by activating the illustrated four sets of frictional force adding means 10. For basic control, unillustrated ordinary brake means (first braking force) is activated to the wheels, and if the friction coefficient $\mu$ between the wheel tires W and the road surface is extremely small as on a frozen road, the frictional force adding means 10 are activated to scatter slip preventive particles to increase the coefficient $\mu$.

In each frictional force adding means 10, when the engine is started, the pump 13 is activated by the controller 20, so that compressed air is fed to the accumulator 14 and is accumulated until it reaches a predetermined pressure detected by the pressure signal from the pressure sensor 15. The solenoid valves 16, 17 are set at positions shown in FIG. 2 in a normal state. Namely, the solenoid valve 16 is set at a position for shutting off compressed air, and the solenoid valve 17 is set at a position for leading to the bypass passage $L_3$. When a control signal is sent from the controller 20 to the solenoid valves 16, 17, the solenoid valve 16 is turned on to feed compressed air, and the solenoid valve 17 is turned on to feed compressed air to the particle container 11 to feed the particulate to the injection nozzle 12 to discharge them.

By discharging the particulate, the friction coefficient $\mu$ increases, so that the braking effect on the wheel tire improves. During travel of the vehicle, operations are carried out by properly selecting the action such as start, acceleration, braking and detour. If the $\mu$ value is small, the $\mu$ value recovers by scattering the particulates, so that the vehicle movement such as acceleration, braking and turning during travel stabilizes. At the start, by turning on the solenoid valve 16 and turning off the solenoid valve 17, compressed air is fed to the bypass line $L_3$ to check clogging of the injection nozzle 12, and at the same time the operating states of the solenoid valves 16, 17, motor 13M, etc. are checked.

The above is the basic of the movement stabilizing control. Next, control of start and end of the operation in the stabilizing control will be described with reference to the flowchart of FIG. 3. When the engine is started and the program in the controller 20 is activated, in step $S_1$, the memory in the temporary memory is initialized, so that any previous operating data of the frictional force adding means 10 are erased. In $S_2$, the passage of a predetermined time is waited, during which the above-described various preliminary checks are made. In $S_3$, based on signals from the various sensors and switches, the wheel speeds, acceleration, deceleration and estimated vehicle speed are computed. Based on them, slip rates are determined (from the friction coefficients $\mu$), and input processing is made for judging as to whether the road surface is a high-$\mu$ road or not.

In $S_4$, determination is made as to whether the frictional force adding means 10 is being activated. Since it is naturally negative initially, it proceeds to $S_5$ and following steps to check if the stepping of the brake pedal is on (in $S_5$), if the vehicle is traveling (in $S_6$), if vehicle body deceleration <$KG_1$ (in $S_7$), if stepping force >$KF_s$ (in $S_8$). Determinations in $S_5$–$S_8$ are all basic conditions for activating the frictional force adding means 10. Under these conditions, it is necessary to activate it. In a state in which the brake pedal has been stepped in, the vehicle body deceleration is larger than a predetermined value during travel, and the stepping force is kept above a predetermined value $KF_s$, this means that wheel slip is developing. Thus in $S_9$, the frictional force adding means 10 are activated for all the wheels.

If determination in $S_5$ and $S_6$ are not met, there is no stepping of the pedal, or the vehicle is not being travelled. Thus, it returns to the top of the flow, and the above determinations are repeated. In $S_7$, if the vehicle body deceleration is not less than the predetermined value $KG_1$, it proceeds to $S_{10}$. If either of the conditions that the slip rates of one or more of the four wheels are not less than $KS_s$, and that in $S_{11}$, ABS is ON is met, the frictional force adding means 10 for the four wheels are activated. If neither of the conditions is met, it returns to the top of the flow and the above determinations are repeated.

That the slip rates of one or more of the four wheels are above the predetermined value $KS_s$ indicates that the vehicle is traveling on a road surface where the friction coefficient $\mu$ is, at least partially, extremely small. That a signal of ABS being on is being received means that if $\mu$ is small, ABS is activating beyond the limit. Thus, in either case, the frictional force adding means 10 is activated.

While the vehicle is travelling with these operations repeated, the frictional force adding means 10 will be activated in due course. Thus, when the control cycle of the flowchart proceeds, activation of the adding means is turned on by the determination in $S_4$. In this case, a check of the end of operation is carried out in $S_{21}$ and following steps. Checking is made as to whether or not the step-in switch 24 of the brake pedal has been turned off (STP: off) in $S_{21}$, whether or not the vehicle is at a stop in $S_{22}$, whether vehicle body deceleration <$KG_E$ in $S_{23}$, whether the stepping force <$KF_E$ in $S_{24}$, and whether (stepping force this time— previous stepping force) <$KD_{FE}$ in $S_{25}$. If YES in any step, operation of the frictional force adding means 10 for all the four wheels will be immediately stopped (turned off).

The above five conditions are all actions showing that the brakes have been relaxed. By responding quickly at early timing for any of these conditions, unnecessary operation of the frictional force adding means 10 is prevented by terminating the control. By preventing unnecessary operations, wasteful consumption of scattered material is avoided. Vehicle stop in $S_{22}$ is detected by signals from the wheel speed sensors 21, the vehicle body deceleration in $S_{23}$ is detected by signals from the front and rear G sensors 22, and the step-in force is detected in $S_{24}$ and $S_{25}$ by signals from the hydraulic pressure sensor 23 or stepping force sensor 24.

Further, in $S_{26}$, whether or not the state of wheel slip <$KS_E$ has continued for all four wheels for KT period is detected. In $S_{27}$, it is detected whether the ABS activation signal has not been received for a period of $KT_{ABS}$ or over. This is also in order to prevent unnecessary operation of the frictional force adding means 10 and to prevent wasteful consumption of scattered material. The fact that the state in which the wheel slip is smaller than a predetermined value $KS_E$ has lasted for a predetermined period KT (in $S_{26}$) indicates that the state in which the wheel slip is at a practically ignorable level has continued a predetermined period or longer. The fact that the ABS activation signal has not been received for a predetermined period $KT_{ABS}$ or longer (in $S_{27}$) indicates that it is unnecessary any more to improve the coefficient $\mu$. If the operation was terminated simultaneously with the end of ABS control, start and end of the operation would be repeated with slight change in the road surface condition.

Figure 4A:
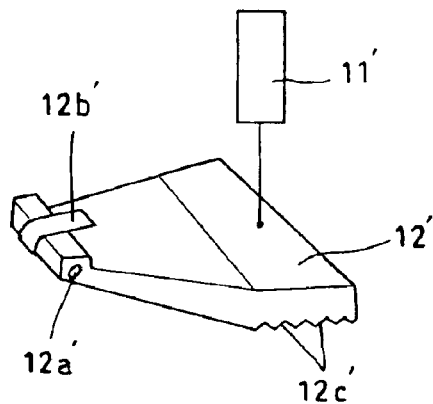
FIG. 4 is a circuit diagram of another embodiment of the frictional force adding means of the same.

In the above embodiment, as the frictional force adding means 10, the particulate scattering type is used. But instead, means using a friction plate 12' as shown in FIG. 4A may be used. The friction plate 12' shown in FIG. 4A is an example of a type which is installed at a suitable position of the vehicle body frame and in a normal state, held above the road surface, and when necessary, is lowered to engage the road surface.

Figure 4B:
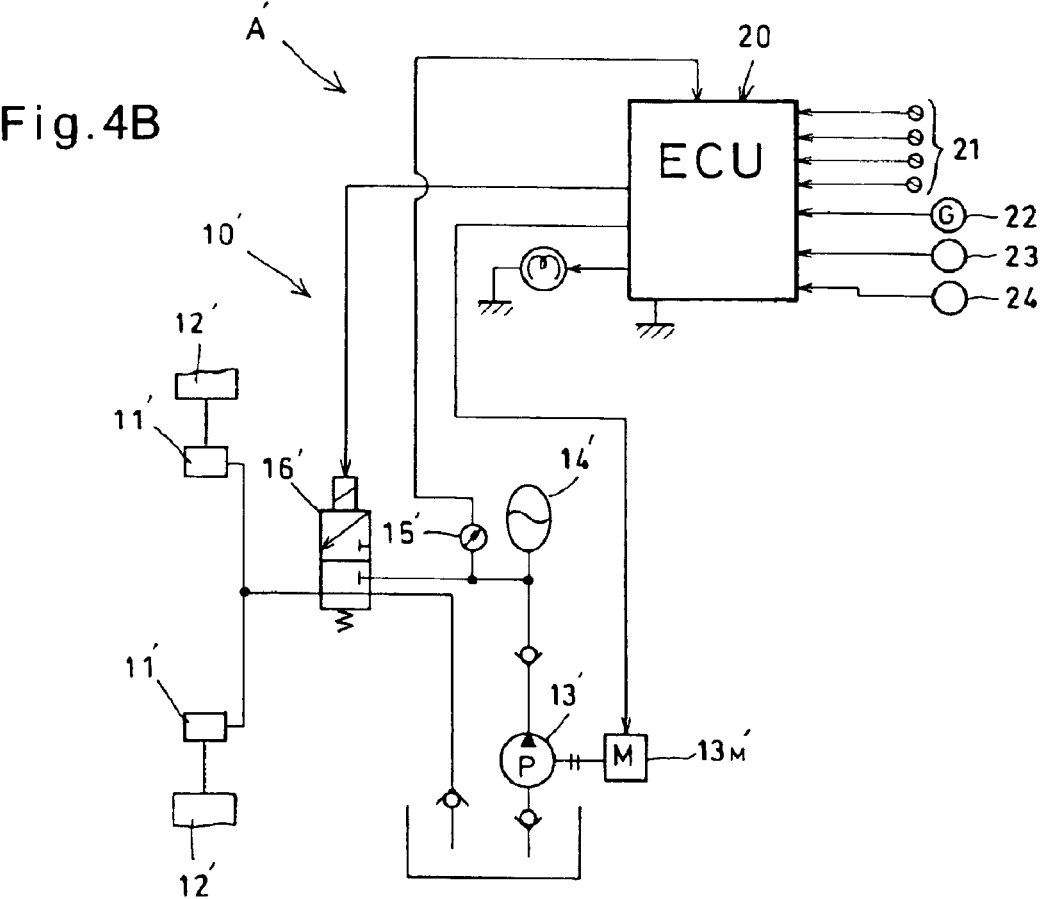

The friction plate 12' is rotatably supported on a pivot shaft 12a'. At its end, a leaf spring 12b' is mounted so that to the friction plate 12', an elastic force in the rising direction is always applied. To the friction plate 12', a hydraulic cylinder 11' is connected, and when necessary, the hydraulic cylinder 11' is activated to lower the friction plate 12'. FIG. 4B shows a circuit diagram of the frictional force adding device in which two sets of friction plates 12' are provided to add a frictional force.

It includes a hydraulic pump 13', a driving motor $13_M'$, an accumulator 14', a pressure sensor (switch) 15', and an solenoid valve 16'. Since the hydraulic circuit is not provided with a bypass passage, the solenoid valve 16' is used commonly for the two friction plate 12'. But actually, the friction plates 12' are provided in four sets, so that the hydraulic circuit is provided in two sets.

From the controller 20, a control signal is sent to the solenoid valve 16' and motor $13_M'$ and these actuators are driven. Also, a detection signal of the pressure sensor 15' for detecting hydraulic pressure is sent to the controller 20. Connection is made to send signals from the wheel speed sensors 21 ($S_1$–$S_4$), the front and rear G sensors 22, hydraulic pressure sensor 23 and stepping force sensor 24 to the controller 20.

For the operation of the frictional force adding means 10' of the type using the friction plates 12', too, it is preferable to prevent the friction plates from unnecessarily operating as in the case of the type of using a material to be scattered.

Figure 5:
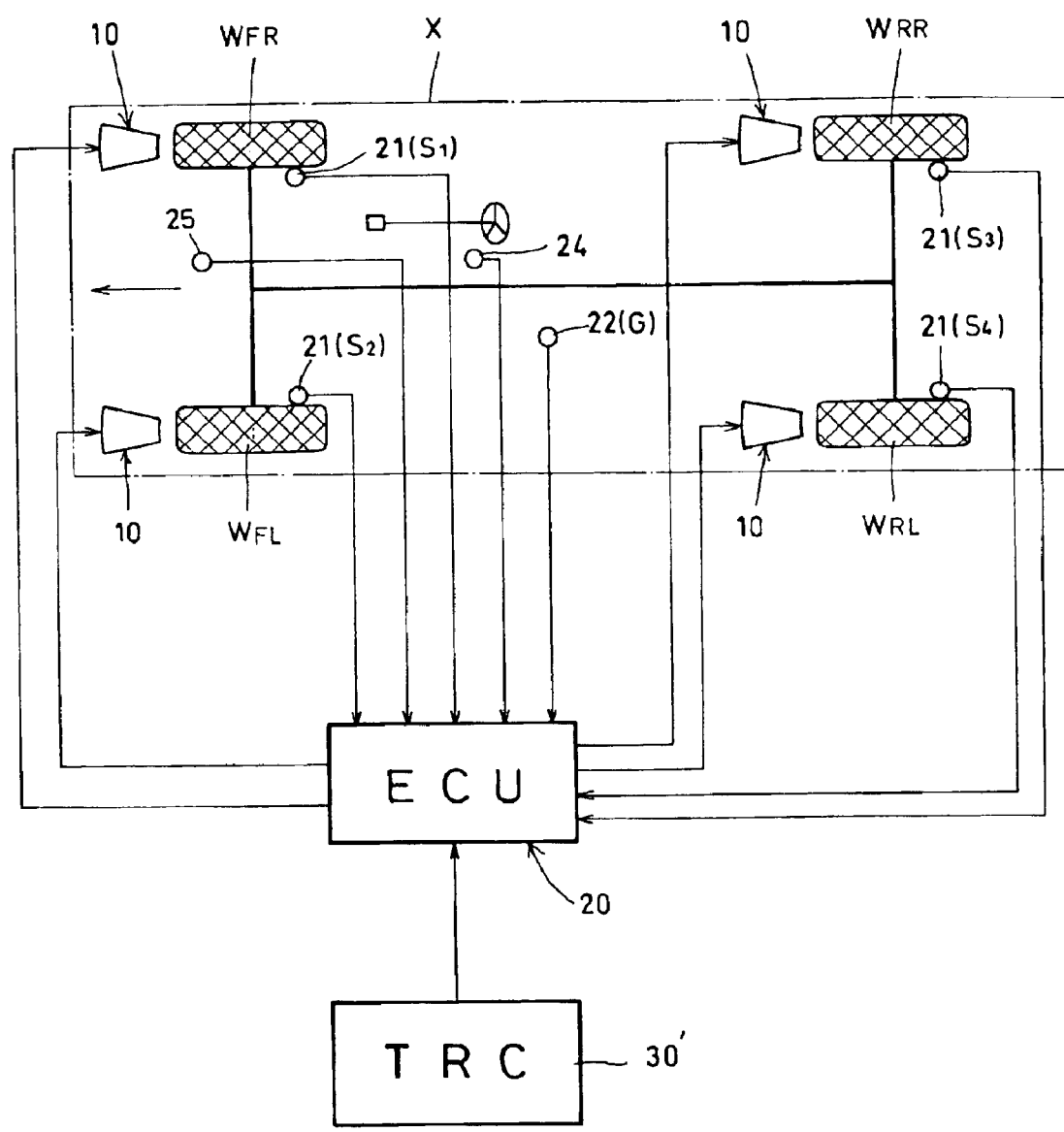
FIG. 5 is a schematic diagram of the movement stabilizing device of a second embodiment.

FIG. 5 shows a schematic diagram of the movement stabilizing device of the second embodiment. This embodiment is an example in which the start/end control of the frictional force adding means 10 is applied to the movement stabilizing control during acceleration. This embodiment is the same as the first embodiment in its basic structure. But the manner of control is different. The basic structure that is not particularly described is the same as in the first embodiment, and their description is omitted, but the same numerals are used. Description will be made about the structure and control programs that are different from those of the first embodiment. As shown, as for sensors, the hydraulic pressure sensor 23 is omitted, and a throttle opening sensor 25 is provided.

It is also different in that in activating the frictional force adding means 10 for acceleration control, a TRC (traction) controller 30' is additionally provided for TRC control. TRC is a known control method in which in the case of an FF car, in starting and accelerating by stepping in the accelerator pedal, if the road surface becomes slippery, so that a front wheel slips and the wheel speed of the front wheel exceeds the vehicle speed estimated from the rear wheel speed, determination is made that slip has occurred, so that the degree of opening of the throttle valve is controlled according to the degree of slip, and the engine output is controlled by controlling such as fuel cut or ignition delayed angle.

With this vehicle movement stabilizing device, control of the movement stabilization during acceleration is carried out as follows. In this embodiment, acceleration control is carried out by activating the frictional force adding means 10 during acceleration. It is important to reliably carry out the start and end of the acceleration control. The second embodiment is the same in the basic operation as in the first embodiment. Control is carried out by activating the frictional force adding means 10 to increase or add the frictional force, though it differs from the first embodiment in that this control is carried out during acceleration control. Thus, as for the description of the basic operation, reference is made to the description of the first embodiment. Below, description will be made about the start/end control of the frictional force adding means 10 with reference to the flowchart of FIG. 6.

Figure 3:
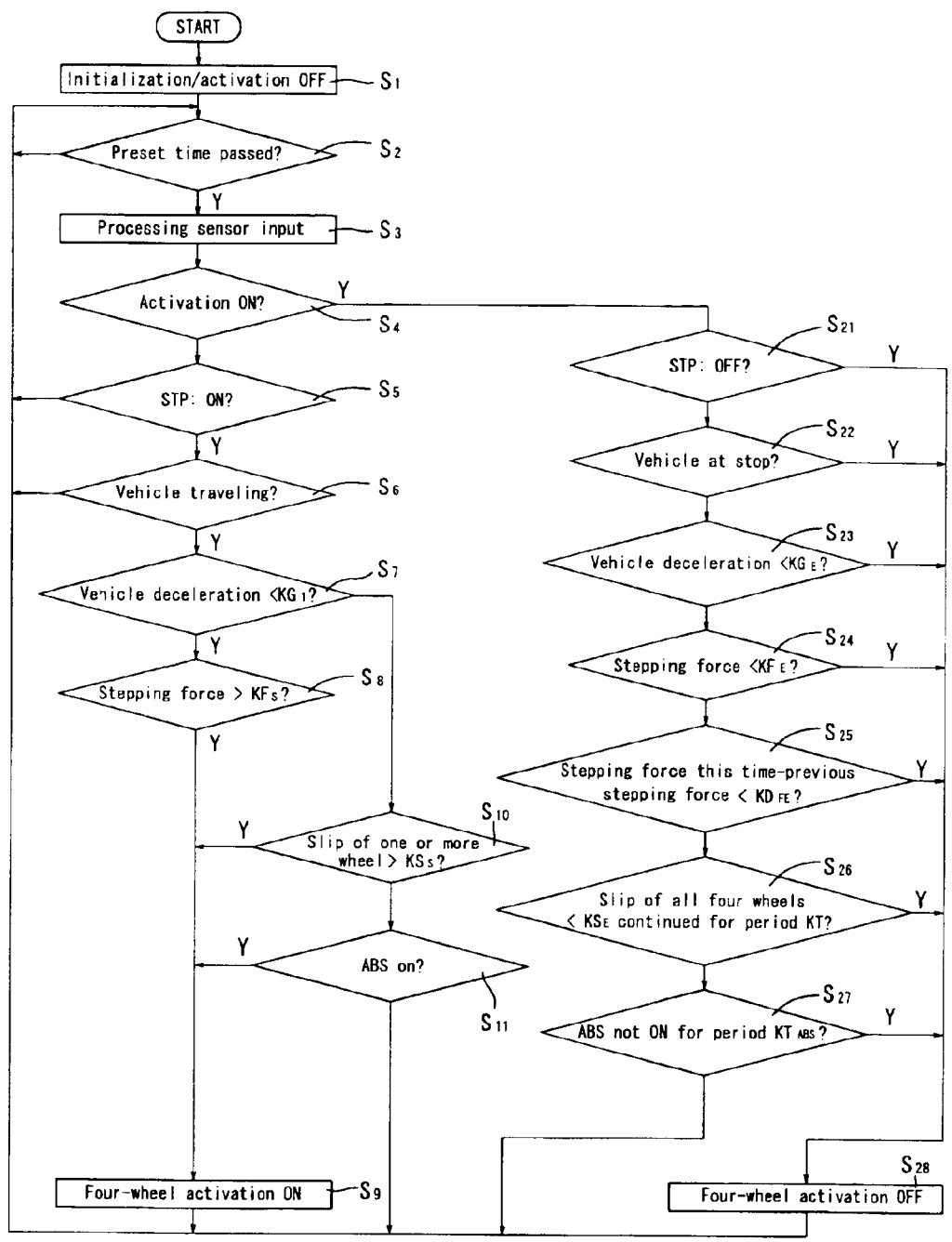
FIG. 3 is a flowchart explaining the operation of the same.
Figure 6:
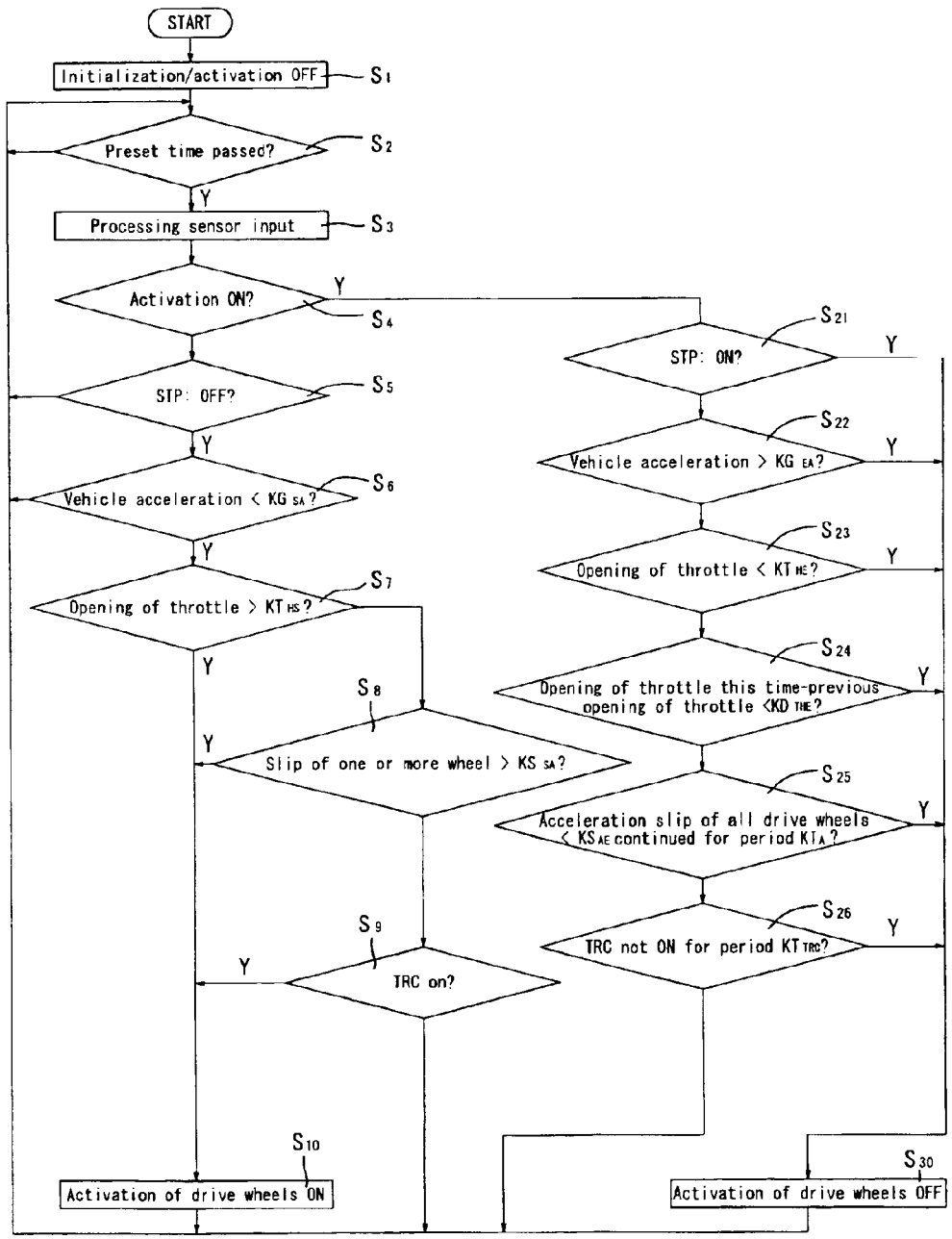
FIG. 6 is a flowchart explaining the operation of the same.

In FIG. 6, sensor input processing in step $S_1$–$S_4$ is the same as in FIG. 3. But in this case, sensor input processing is carried out for the acceleration control. Since the determination in $S_4$ is initially negative (NO), it proceeds to $S_5$, $S_6$ and $S_7$. In $S_5$, determination is made by the step-in switch 24 as to whether the step-in of brake pedal is off. It is determined in $S_6$ as to whether the vehicle acceleration is not more than a predetermined acceleration value $KG_{SA}$. Also, it is determined in $S_7$ as to whether throttle opening >$KT_{HS}$. If, while the vehicle body acceleration is less than the predetermined value $KG_{SA}$, i.e. the vehicle acceleration is not so large in $S_6$, the throttle opening is greater than the predetermined value $KT_{HS}$ in $S_7$, the vehicle is in a state in which due to extremely small friction coefficient $\mu$ of the road surface, wheels are slipping. Thus, it proceeds to $S_{10}$ to activate the frictional force adding means 10 for all the wheels.

Even if the throttle opening is not more than the predetermined value $KT_{HS}$ in $S_7$, if the acceleration slip >$KS_{SA}$ for one or more wheels in $S_8$, or if TRC control signals are being received in $S_9$, it proceeds to $S_{10}$ to activate the frictional force adding means 10 for all the wheels. This is because if any of the conditions in $S_7$, $S_8$ and $S_9$ is met, it is necessary to make the acceleration control effective by recovering the slip rate. If none of the conditions of $S_7$–$S_9$ is met, slip is determined not large. Thus, it returns to steps before $S_2$ and the above determinations are repeated. If the condition of the road surface changes and the value of the friction coefficient $\mu$ becomes extremely small, one of the conditions of $S_7$–$S_9$ is met (YES).

When the frictional force adding means is activated in $S_{10}$, determination in $S_4$ in the next cycle will be YES, so that it proceeds to $S_{21}$. In $S_{21}$ and the following steps, determination is made as to each of the control end conditions. First, in $S_{21}$, determination is made as to whether the brake pedal step-in switch 24 has been turned on, in $S_{22}$ as to whether vehicle acceleration >$KG_{EA}$, in $S_{23}$ as to whether throttle opening <$KT_{HE}$, in $S_{24}$ as to whether throttle opening this time minus previous throttle opening <$KD_{THE}$, in $S_{25}$ as to whether acceleration slip for all of the wheels <$KS_{AE}$ has continued for a period $KT_A$, and in $S_{26}$ as to whether the state in which TRC activating signals have not been received has continued for a period $KT_{TRC}$.

If any one of the determinations of $S_{21}$–$S_{26}$ is met, it proceeds to $S_{30}$ to turn off the frictional force adding means 10. This is because if any of the above determinations is met, there is no need to regard occurrence of slip as a problem any more and acceleration is being carried out without the assisting operation of the frictional force adding means 10, or the vehicle is in a state in which no acceleration is needed.

Figure 7:
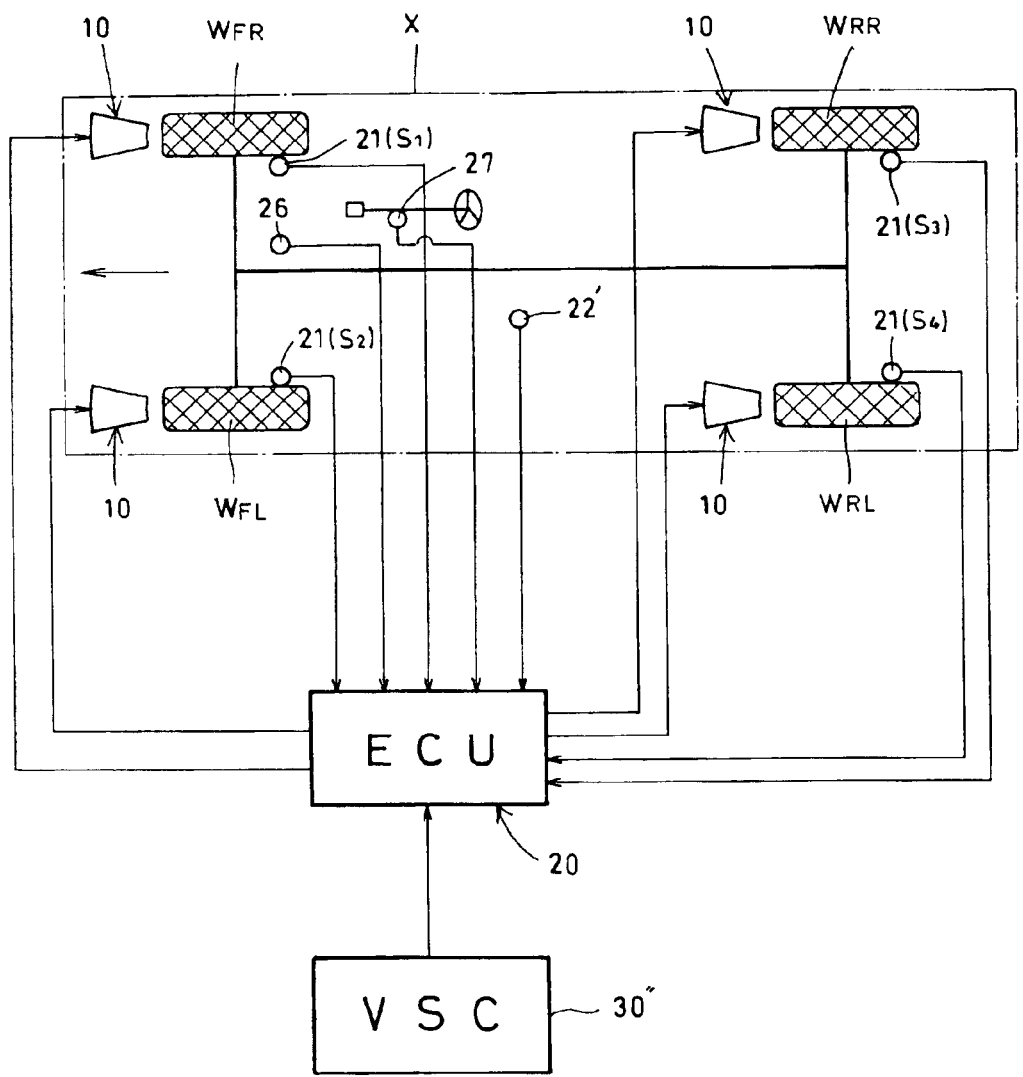
FIG. 7 is a schematic diagram of the movement stabilizing device of a third embodiment.

FIG. 7 shows a schematic diagram of the vehicle movement stabilizing device of the third embodiment. In this embodiment, the start/end control of the frictional force adding means 10 is applied to movement stabilizing control for controlling stabilizing the turning movement during travel. In its basis structure, this embodiment is the same as the first embodiment but is different in what controlled. As for basic structures, their description is omitted with the same numerals attached. Only structures and control programs that are different from those of the first embodiment will be described. As shown, wheel speed sensors 21 ($S_1$–$S_4$), a lateral G sensor 22', a yaw rate sensor 26, and a steering angle sensor 27 are connected to the controller 20.

It also differs in that in activating the frictional force adding means 10 during turning in traveling, a VSC (vehicle stability controller) 30" (hereinafter abbreviated to VSC controller) is provided for VSC control. VSC control is a known control method in which if oversteer (OS) or understeer (US) occurs while turning during travel according to the road surface condition, vehicle speed and emergency avoidance, such a state is automatically stabilized. The travel state is determined by detecting signals from the steering angle ($\phi$) sensor 27, the wheel speed sensors 21, the yaw rate sensor 26, and signals of the lateral acceleration or deceleration from the lateral G sensor 22, and computing in the controller 30".

OS tendency is determined from the values of the slip angle and slip angular speed of the vehicle body, and US tendency is determined from the deviation between the target yaw rate and the actually measured yaw rate. In ordinary VSC control, if the OS tendency is large, brake is applied to the front turning outer wheel according to the degree of OS tendency to suppress the OS tendency by canceling the vehicle turning moment with a moment in a reverse direction, and if the US tendency is large, the engine output is controlled according to the degree of US tendency to suppress the US tendency by applying the brake to the rear turning inner wheel.

In such VSC control, it is a prerequisite that during braking, a required frictional force of the wheel tires to the road surface is obtainable. If the friction coefficient $\mu$ of the road surface is extremely small such as on a frozen road, a required braking force is not obtainable even if the brakes are pressurized. Thus the VSC control is insufficient. In order to stabilize the vehicle movement in such a case by activating the frictional force adding means 10 to recover the value of $\mu$, the VSC control is also provided.

With this vehicle movement stabilizing device, control for movement stabilization during turning is carried out as follows. In this embodiment, by operating the frictional force adding means 10 during turning, movement control is carried out. In this embodiment, too, it is important to reliably carry out the start and end of the operation of the frictional force adding means 10. Although the control is carried out by increasing or adding the frictional force by activating the frictional force adding means 10, this embodiment differs from the first embodiment only in that this control is carried out during turning, and the basic operation is the same as in the first embodiment. Thus, as for the description of the basic operation, reference should be made to the description of the first embodiment. Below, description will be made about the start/end control of the adding means 10 with reference to the flowchart of FIG. 8.

Figure 8:
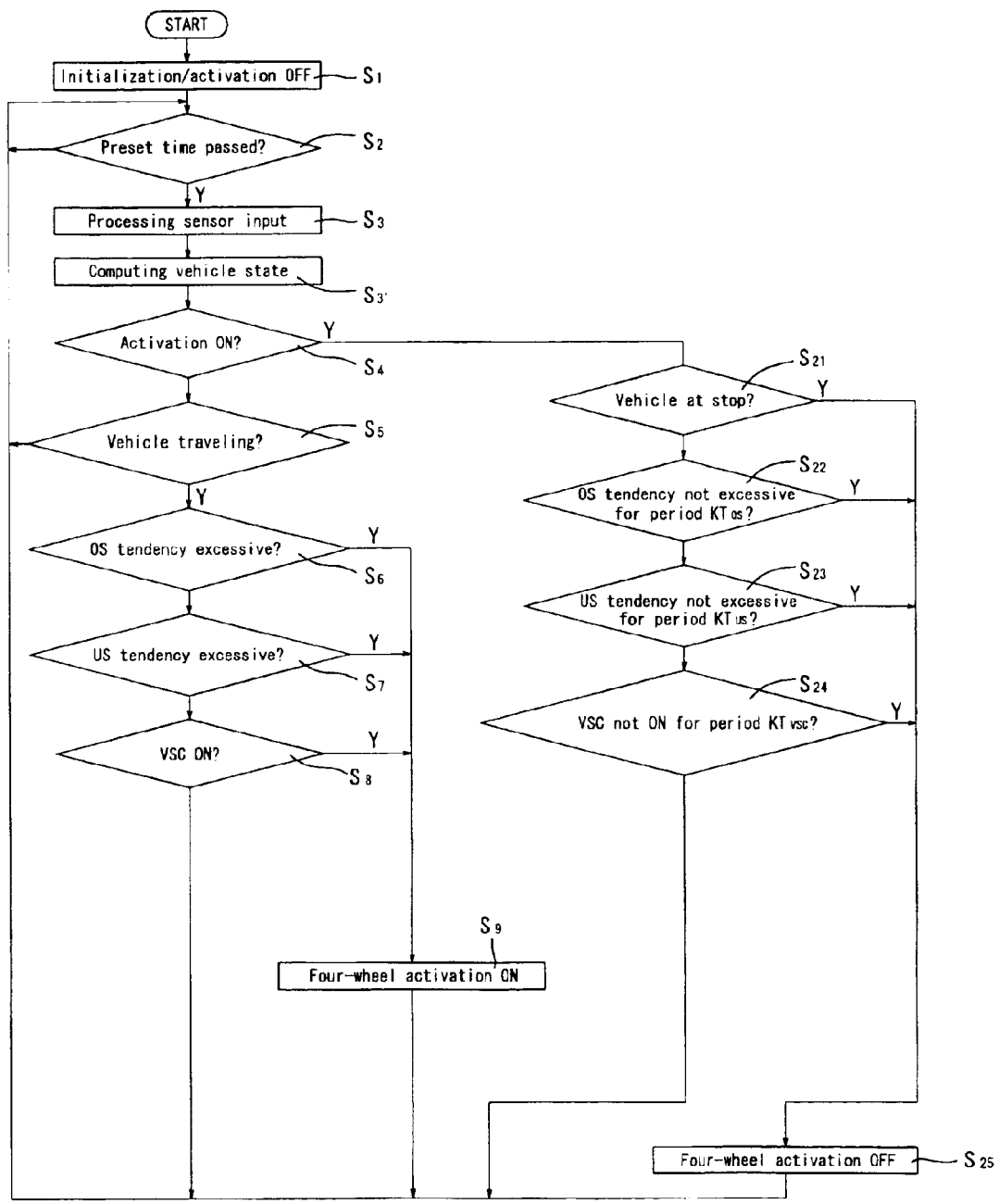
FIG. 8 is a flowchart explaining the operation of the same.

In FIG. 8, the input processing in $S_1$–$S_4$ is the same as in FIG. 3. But in this embodiment, the sensor input processing is carried out for the turning movement. Thus, in $S_3'$, the step of computing the vehicle state is added. Computing of the vehicle state is computing the turning state of the vehicle resulting from the operation of the steering wheel during travel. Since the determination in $S_4$ is negative (NO) initially, it proceeds to $S_5$–$S_8$. Determination is made as to whether the vehicle is traveling in $S_5$, whether the OS tendency is excessive in $S_6$, whether the US tendency is excessive in $S_7$, and whether the VSC is being activated in $S_8$. If any one of $S_6$–$S_8$ is YES, operation of the frictional force adding means 10 is started for all the four wheels.

After the operation of the frictional force adding means 10 has started, the determination in $S_4$ will be YES, so that determination is made as to whether any of the control end conditions in $S_{21}$ and the subsequent steps is met. Determination is made first as to whether or not the vehicle has stopped in $S_{21}$, whether or not the state in which the OS tendency is not excessive has continued for a period $KT_{OS}$ in $S_{22}$, whether or not the state in which the US tendency is not excessive has continued a period $KT_{US}$ in $S_{23}$, and whether or not the state in which VSC is not operating has continued for a period $KT_{VSC}$ in $S_{24}$. If any one of these conditions is met, the operation of the frictional force adding means 10 for all the four wheels are instantly stopped (off). This is because these four conditions are states in which it is not necessary to activate the frictional force adding means 10 and unnecessary movements should be stopped.

In the first, second and third embodiments, examples were described in which in carrying out control with the vehicle movement stabilizing device, one of an ABS controller, TRC controller and VSC controller is added to carry out the respective control. But the ABS controller, TRC controller or VSC controller may not be necessarily provided. If they are not provided, the determination conditions relating to the ABS control, TRC control and VSC control are omitted.

Even if these controllers are not provided, in effectively functioning the braking, acceleration and turning actions of the vehicle by the activation of the frictional force adding means, by reliably carrying out the start and end of the activation, it is possible to prevent repletion of unnecessary actions and wasteful use of slip preventive particles. Also, it is needless to say that all of the ABS controller, TRC controller and VSC controller may be provided.

As described above, the vehicle movement stabilizing device of this invention has the frictional force adding means for increasing the frictional force to the road surface, and the controller for controlling the frictional force adding means in response to the signals of the sensors for detecting the travel and turning movement of the vehicle. The controller detects the conditions for starting the operation of the frictional force adding means based on the signals from various sensors and switches and starts the operation at the braking, acceleration and turning movement during travel of the vehicle, and when it detects an end signal which indicates that the condition has disappeared, a control signal is given to end the operation. Thus, only if the operation of the frictional force adding means is necessary, its operation is started, and when the operation is unnecessary, the operation is reliably ended. Thus it is possible to prevent the repetition of unnecessary operation.

What is claimed is:

1. A vehicle movement stabilizing device comprising first frictional force adding means for increasing frictional force between wheels and a road surface by brake hydraulic pressure control, second frictional force adding means having an actuator and an actuated member for increasing the frictional force of the wheels to a road surface by driving said actuated member with said actuator, various sensors including wheel speed sensors, for detecting braking, acceleration and turning movement of the vehicle, and a controller for outputting a signal for controlling the activation of said actuator in response to signals from said sensors, said controller being structured to output control signals for starting control in response to the signals from said sensors, and to output a another signal for ending the activation of said actuator, which is driven if the frictional force of the wheels to the road surface is not more than a predetermined value during braking, acceleration or turning of the vehicle, if said controller detects that the state necessitating the driving of said actuator has disappeared.

2. A vehicle movement stabilizing device as claimed in claim 1 wherein said controller is structured to output the another control signal for ending the activation of said actuator if it detects a signal indicating return of step-in of an accelerator, a signal indicating the continuation of acceleration slip of not more than a predetermined value for a predetermined period or over, or a signal indicating the continuation of non-activation of TRC control for a predetermined period or over.

3. A vehicle movement stabilizing device as claimed in claim 1 wherein said controller is structured to output the another control signal for ending the activation of said actuator if it detects a signal indicating stop of the vehicle, a signal indicating the continuation of non-excessiveness of OS tendency or US tendency for a predetermined period or over, or a signal indicating the continuation of non-activation of VSC control for a predetermined period or over.

4. A vehicle movement stabilizing device comprising frictional force adding means having an actuator and an actuated member for increasing the frictional force of wheels to a road surface by driving said actuated member with said actuator, various sensors including wheel speed sensors, for detecting braking, acceleration and turning movement of the vehicle, and a controller for outputting a signal for controlling the activation of said actuator in response to signals from said sensors, said controller being structured to output control signals for starting control in response to the signals from said sensors, and to output another signal for ending the activation of said actuator, which is driven if the frictional force of the wheels to the road surface is not more than a predetermined value during braking, acceleration or turning of the vehicle, if said controller detects that the state necessitating the driving of said actuator has disappeared, wherein said controller is structured to output the another control signal for ending the activation of said actuator if it detects as said end signal a signal indicating relaxing of brakes, a signal indicating the continuation of wheel slip of not more than a predetermined value for a predetermined period or over, or a signal indicating the continuation of non-activation of ABS control for a predetermined period or over.

\* \* \* \* \*